(12) United States Patent
Maloney

(10) Patent No.: US 8,143,733 B2
(45) Date of Patent: Mar. 27, 2012

(54) SYSTEM AND METHOD FOR PROVIDING NAUTICAL TORQUE TECHNOLOGY

(76) Inventor: Cahill C. Maloney, San Francisco, CA (US)

( * ) Notice: Subject to any disclaimer, the term of this patent is extended or adjusted under 35 U.S.C. 154(b) by 537 days.

(21) Appl. No.: 12/399,812

(22) Filed: Mar. 6, 2009

(65) Prior Publication Data

US 2010/0045035 A1    Feb. 25, 2010

Related U.S. Application Data

(60) Provisional application No. 61/069,087, filed on Mar. 12, 2008.

(51) Int. Cl.
    *F03B 13/10* (2006.01)
(52) U.S. Cl. .............................. 290/42; 290/53
(58) Field of Classification Search .................... 290/42, 290/53
    See application file for complete search history.

(56) References Cited

U.S. PATENT DOCUMENTS

| | | | | |
|---|---|---|---|---|
| 2,636,390 | A * | 4/1953 | Wagner | 74/15.2 |
| 3,574,287 | A * | 4/1971 | Heidacker | 474/136 |
| 3,938,797 | A * | 2/1976 | Frederick | 269/20 |
| 4,389,843 | A * | 6/1983 | Lamberti | 60/507 |
| 4,718,231 | A * | 1/1988 | Vides | 60/398 |
| 5,047,654 | A * | 9/1991 | Newman | 290/52 |
| 5,105,094 | A * | 4/1992 | Parker | 290/53 |
| 5,808,369 | A * | 9/1998 | Whelan | 290/55 |
| 5,872,406 | A * | 2/1999 | Ullman et al. | 290/53 |
| 5,929,531 | A * | 7/1999 | Lagno | 290/53 |
| 6,140,712 | A * | 10/2000 | Fredriksson et al. | 290/53 |
| 6,269,636 | B1 * | 8/2001 | Hatzilakos | 60/398 |
| 7,199,483 | B2 * | 4/2007 | Lomerson et al. | 290/53 |
| 2006/0232072 | A1 * | 10/2006 | Manchester | 290/42 |
| 2007/0164568 | A1 * | 7/2007 | Greenspan et al. | 290/53 |
| 2007/0176429 | A1 * | 8/2007 | Lomerson et al. | 290/53 |
| 2007/0222221 | A1 * | 9/2007 | Hamburg | 290/53 |
| 2007/0228737 | A1 * | 10/2007 | Hirsch | 290/42 |
| 2008/0018114 | A1 * | 1/2008 | Weldon | 290/53 |

* cited by examiner

*Primary Examiner* — Tho D Ta

(57) ABSTRACT

Nautical torque tidal movement technology provides systems, apparatus and methods for producing nautical torque tidal movement electrical power generation from tidal movement. A system provides for producing electrical power utilizing an arrangement of power generating devices electrically interconnected and operating independently to receive kinetic energy from the movement of water, and to convert energy utilizing a plurality of 1800 RPM accelerator gear boxes mechanically coupled to a large particle of mass traveling at a rate of substantially 1 foot per hour in a substantially vertical direction coupled to one or more torque conversion units. Apparatus and methods further include various configurations of power generating devices, torque conversion units, accelerator gearing boxes, and drive arms that are coupled to a large particle of mass that is a minimum of 200 million tons. Systems and methods also include a nautical torque landlocked design.

18 Claims, 12 Drawing Sheets

SYSTEM AND METHOD FOR PROVIDING NAUTICAL TORQUE TECHNOLOGY

CROSS-REFERENCES TO RELATED APPLICATIONS

This application claims the benefit of U.S. Provisional Application No. 61/069,087, filed Mar. 12, 2008, the disclosure of which is incorporated herein by reference in its entirety.

BACKGROUND

The present invention relates generally to a system and method for providing nautical torque technology, and more particularly to providing nautical torque, tidal movement supplied electricity power production.

Various methods and machines that are directed to providing electrical power production generating large megawatts of electricity are well known in the art. Many of these technologies involve coal fired power plants, solar photovoltaic cells, nuclear fusion or fission, and hydroelectric power utilizing steam and gas fired turbines. Some of these technologies require large quantities of natural resources in limited supply. On the other hand, alternate technology approaches require small particles accelerated to very high speeds to generate power or energy. For example, in nuclear power plants, the laws of physics provide that energy is equivalent to mass times the speed of light squared. This law illustrates the principle that small sub-atomic particles accelerated at the speed of light squared generates energy, and ultimately power. Applicant's invention embodies the converse theory that large particles of slow moving matter also generate energy, and ultimately power.

In one technology, tidal stream generators draw energy from currents in much the same way as wind turbines. The higher density of water, 832 times the density of air, means that a single generator can provide significant power at low tidal flow velocities (compared with wind speed). Given that power varies with the density of medium and the cube of velocity, it is simple to see that water speeds of nearly one-tenth of the speed of wind provide the same power for the same size of turbine system. However this limits the application in practice to places where the tide moves at speeds of at least 2 knots (1 m/s).

More conventional methods of electrical power generation include wind turbines, hydroelectric, water mass transfer mills, nuclear power, and coal fired gas and steam turbines.

However, some conventional power generation technologies have suffered from a shortage of finite natural resources as fuel or a limited access to massively large amounts of capital to build new systems to generate electrical power such as coal, oil and gas fired turbines, and hydroelectric systems with steam powered turbines. Further, nuclear fission power generation has suffered substantially from severe safety concerns and waste fuel disposal complications. All of the above existing technologies exhibit further drawbacks in environmental impact, especially greenhouse gases and air pollution.

One known technology approach with potentially more favorable economics, involves achieving useful fusion reaction producing conditions via a hydrodynamic inertial confinement means. However, the lack of stability of compression and the very high density of particles required of small amounts of materials in spherical or other convergent geometries is difficult to achieve. All conventional magnetic approaches to the generation of fusion power are practically unable to take advantage of the natural large energy gain, which can be as large as 2000 for ratio of energy output to energy input per fusion reaction. Successful variations of this technology however hold the promise of substantial megawatts of power production utilizing the methods of inertial confinement and magnetic confinements.

On the other hand, renewable energies, such as wind, solar, ethanol and bio-fuels offer promise to lower emissions but each has demonstrated significant drawbacks in the economics required for power generation at the levels required for large scale commercial development and favorable investment returns. Existing nuclear fusion technologies, such as outlined above, is one solution if eventually proven commercially feasible but simpler and less costly systems, methods and apparatus is also needed to serve future markets. One approach has been tidal movement electricity generation methods in general. However, what is missing in many of these systems is a way to efficiently generate large amounts of electrical power at low cost.

Therefore it is desirable to provide a different and more efficient electrical power generation tidal movement technology along with related systems, devices, apparatus and methods. The present invention provides a nautical torque tidal movement electricity production system for providing tidal movement power generation utilizing a series of bellows, flow control feedback devices, power generation hydraulic cylinder devices, and various mechanical coupling devices engineered to generate electrical power. It may also be desirable to provide an embodiment that includes a nautical torque land locked design, with or without a large particle of mass that is near a dock. In one embodiment, a series of power generation devices and electrical turbines are coupled to one or more 1800 RPM accelerator gear boxes. In another embodiment a 40,000 ton bulk cargo ship, large particle of mass utilizes tide movement to generate electrical power by coupling a plurality of transmission signals from a coupled power generating device and a tidal movement or gravitational water supply source. In other aspects, the design may variously include one or more lower water holding tanks and a pumped fluid return line. All these aspects provide embodiments that overcome the above and other problems.

BRIEF SUMMARY OF THE INVENTION

In one embodiment as shown in FIG. 1, a system for nautical torque tidal movement power generation comprises an arrangement of one or more power generating devices; said arrangement composed of said one or more devices that are modular and electrically interconnected; said one or more power generating devices operating independently of each other as components of said arrangement and wherein said devices are interchangeable with each other in a plurality of positions within said arrangement; said one or more power generating devices are positioned to receive kinetic energy from the movement of water, and wherein said one or more power generating devices convert said energy by the movement within each of said device; one or more 1800 RPM accelerator gear boxes wherein said accelerator gear boxes are mechanically coupled to a large particle of mass; at least one tidal movement wave wherein said tidal movement wave travels at a rate of substantially 1 foot per hour in a substantially vertical translation such that said large particle of mass floating on a surface of said tidal movement wave would travel a total of one foot per hour; a torque conversion unit comprising an upper drive arm, a lower drive arm, one or more cotter pins, a circular sprocket, a lower free floating guide sprocket, a reversible gear box helical gear unit, one or more deep set, reinforced pylons and a circumference sprocket coupled to said reversible gear box; and a large particle of mass coupled to said tidal movement wave.

According to another aspect of the present embodiment as shown in FIG. 2, an alternative harborage is located so as to be subject to fluctuating water levels, the harborage having at least one port for allowing water to ingress and egress; a vessel hull located in the harborage, the hull being free to move vertically as the water level inside of the harborage rises and falls; a linear-to-rotary converter, at least part of which is coupled between the hull and a fixed object, the converter converting the vertical movement of the hull into rotational movements and the port having a valve for adjusting the flow of water into and out of the harborage; an upper clamping linkage; and one or more successive cylinders wherein said cylinders are contained within one or more power generating devices.

In another aspect of the present embodiment as illustrated in FIG. 3, the apparatus for producing nautical torque tidal movement electrical power generation from tidal movement further comprises at least one electrical turbine adapted to receive a first signal from said one or more tidal movement waves to generate a first electrical transmission signal; at least one drive apparatus located remotely from said turbine configured for receiving at least one said first electrical transmission signal, controlling the speed of rotation of said turbine to adjust the efficiency thereof, and outputting at least one second electrical signal to supply electrical power generated by said turbine; at least one feedback apparatus for providing at least one first control signal for use in controlling the speed of rotation of said turbine by at least one said drive apparatus to adjust the efficiency thereof; and at least one control apparatus for receiving at least one said second electrical transmission signal and outputting at least one third electrical transmission signal to supply electrical power generated by said turbine, wherein at least one said control apparatus is adapted to control the frequency of at least one said third electrical transmission signal, wherein at least one said feedback apparatus is adapted to apply at least one said first control signal responsive to the frequency of at least one said third electrical signal.

In certain other aspects of the present embodiment, as illustrated in FIG. 4, the apparatus may variously include a moveable tank system associated with one or more hydraulic cylinders in which the upward and downward movements of the tank relative to the tide from a surrounding body of water are used to generate nautical torque tidal movement electrical power generation from tidal movement; an enclosure system in which the controlled inflow and outflow of water between one or more enclosures and a surrounding body of water is used to generate nautical torque tidal movement electrical power generation from tidal movement; a bellows system in which the effects of the tidal movements are used to force water from the bellows tank through one or more power generating devices; and a buoyant mass-actuated piston system in which the movement of one or more floating large particle of mass objects relative to the tide is used to generate nautical torque tidal movement electrical power generation from tidal movement.

In another embodiment, as illustrated in FIG. 5, an apparatus for generating nautical torque tidal movement electrical power generation from tidal movement comprises a power device generator including a turbine that operates at a minimum of 240 rpm; at least one industrial gear housing including one or more sprockets coupled to one or more linked chains rotating about a pivot point wherein the rate of the chain of a first industrial gear housing assembly is at a rate of substantially 900 inches per five minutes and the rate of the chain of a second industrial gear housing assembly is at a rate of substantially 27,000 inches per five minutes and the rate of subsequent gear housing assemblies are based on a 30:1 ratio or some other suitable ratio to produce a plurality of 1800 RPM accelerators and generators wherein said at least one industrial gear housing is coupled to a fixed, stationary anchor location and a plurality of 1800 RPM accelerator gear assemblies wherein said accelerator gear assemblies are mechanically coupled to one or more large particles of mass; at least one tidal movement wave wherein said tidal movement wave travels at a rate of substantially one foot per hour in a substantially vertical translation such that said large particle of mass floating on a surface of said tidal movement wave would travel a total of one foot per hour; a torque conversion unit comprising an upper drive arm, a lower drive arm, one or more cotter pins, a circular sprocket, a lower free floating guide sprocket, a reversible gear box helical gearing unit, one or more deep set, reinforced pylons and a circumference sprocket coupled to said reversible gear box; and one or more final large particles of mass directly coupled to said tidal movement wave.

Another aspect of the present embodiment further illustrated in FIG. 5, includes an apparatus for generating nautical torque tidal movement electrical power generation from tidal movement including a large particle of mass wherein said large particle of mass is a bulk cargo vessel coupled to said tidal movement wave wherein said large particle of mass is a minimum of 40,000 million tons configured to transfer the vessel's energy through a drive chain and a turn sprocket at a rate of five minutes per one inch, which will in turn rotate a second sprocket at a rate of 30 inches per five minutes which will transfer said energy to one or more power generating devices.

Another aspect of the present embodiment of the apparatus for generating nautical torque tidal movement electrical power generation from tidal movement shown in FIG. 5, comprises one or more power device generators comprising one or more turbines per power device generator wherein said electrical turbines each operates at a minimum of 240 rpm; at least one industrial gear housing comprising one or more sprockets coupled to one or more linked chains rotating about a pivot point wherein said speed of a first industrial gear housing is at a rate of substantially 900 inches per five minutes and a second industrial gear housing is at a rate of substantially 27,000 inches per five minutes; and said at least one industrial gear housing is coupled to a dock and a plurality of 1800 RPM accelerator gear boxes wherein the reversible gear box is bolted to one or more pylons, each at the midway point between high and low tides to make a corresponding mark on the side of the hull of said bulk cargo vessel such that said mark corresponds with the gear box halfway between the first drive arm and the second drive arm, wherein said first and second drive arms are flush with said first and second sprockets such that said drive chains will fall plum around said second sprocket and fall plum to said lower drive arm and be attached to said lower drive arm with said cotter pin.

In another embodiment, as illustrated in FIG. 6, a nautical torque tidal movement power generation apparatus comprises one or more electrical turbines adapted to receive a first signal from one or more tidal movement waves to generate a first electrical transmission signal wherein said signal transmits kinetic energy from said one or more tidal movement waves from a mass-actuated piston; one or more power generating devices; said one or more power generating devices coupled in an electrically interconnected modular arrangement; said one or more power generating devices operating independently of each other as components of a tidal movement power generation apparatus wherein said devices are interchangeable with each other in a plurality of positions within said arrangement; said one or more power generating devices are positioned to receive kinetic energy from the movement of water, and wherein said devices convert said energy by the movement within each of said device from a first vertical position to a second vertical position; a torque conversion unit upper drive arm; a torque conversion lower drive arm; one or more cotter pins 3; a circular sprocket; a lower free floating guide sprocket; a reversible gear box helical gearing unit; one or more deep set, reinforced pylons; and a circumference sprocket coupled to said reversible gear box.

In various aspects of the present embodiment the one or more electrical turbines move at a minimum rate of 240 RPM.

In yet another embodiment as shown in FIG. 7, the nautical torque tidal movement power generation apparatus comprises a plurality of sprockets that are mechanically coupled to a plurality of industrial bearing houses and a first series of one or more chains; one or more large particles of mass mechanically coupled to a second series of one or more chains; the one or more mechanically coupled chains mechanically coupled to first set of one or more drive arms; the first set of one or more drive arms pivotally coupled to a second set of one or more drive arms to form a drive arm assembly; said drive arm assembly fluidly coupled to one or more cylinders coupled to one or more signals to transmit kinetic energy from one or more tidal movement waves from a mass-actuated piston.

In another aspect of the present embodiment shown in FIG. 7, the nautical torque tidal movement power generation apparatus further comprises the plurality of sprockets that are mechanically coupled to a plurality of industrial bearing houses and a first series of one or more chains; one or more large particles of mass mechanically coupled to a second series of one or more chains; one or more mechanically coupled chains mechanically coupled to one or more drive arms; the first set of one or more drive arms pivotally coupled to a second set of one or more drive arms to form a drive arm assembly; said drive arm assembly fluidly coupled to one or more cylinders that are coupled to one or more signals to transmit kinetic energy from said one or more tidal movement waves from the mass-actuated piston wherein the one or more electrical turbines move at a minimum rate of 240 rpm to generate at least two megawatts of electrical power and are mechanically coupled to a large particle of mass.

In another embodiment as illustrated in FIG. 8, a nautical torque land lock design comprises a first water source, a second water source, a water return line wherein water in a lower water holding tank is pumped back to a second water source holding reservoir and one or more a power device generators further comprising an electrical turbine, a plurality of industrial gear housings including at least a first industrial gear housing and second industrial gear housing that comprises one or more sprockets coupled to one or more linked chains rotating about a pivot point wherein said speed of said first industrial gear housing is at a rate of substantially 900 inches per five minutes and a second industrial gear housing is at a rate of substantially 27,000 inches per five minutes; and said plurality of industrial gear housings are coupled to a dock and a plurality of 1800 RPM accelerator gear boxes wherein said accelerator gear boxes are mechanically coupled to a large particle of mass; at least one tidal movement wave wherein said tidal movement wave travels at a rate of substantially 1 foot per hour in a substantially vertical translation such that said large particle of mass floating on a surface of said tidal movement wave would travel a minimum total of one foot per hour, wherein said large particle of mass is of sufficient mass to produce such minimum travel.

In another embodiment as illustrated in FIG. 8, the nautical torque land lock design further comprises a torque conversion unit including an upper drive arm, a lower drive arm, one or more cotter pins, a circular sprocket, a lower free floating guide sprocket, a reversible gear box helical gearing unit, one or more deep set, reinforced pylons and a circumference sprocket coupled to said reversible gear box helical gearing unit; and the large particle of mass coupled to said tidal movement wave.

In another embodiment, as illustrated in FIG. 9, a method for providing nautical torque tidal movement power generation comprises the steps of arranging one or more power generating devices; electrically interconnecting said one or more devices to operate independently of each other; positioning said devices to receive kinetic energy from the movement of water, wherein said devices convert said energy by the movement within each of said device; moving said devices by coupling at least one tidal movement wave wherein said tidal movement wave travels at a rate of substantially 1 foot per hour in a substantially vertical direction such that a large particle of mass floating on a surface of said tidal movement wave would travel a total of one foot per hour; mechanically coupling a plurality of 1800 RPM accelerator gear boxes wherein said accelerator gear boxes are mechanically coupled to said large particle of mass; coupling said tidal movement wave to a torque conversion unit comprising an upper drive arm, a lower drive arm, one or more cotter pins, a circular sprocket, a lower free floating guide sprocket, a reversible gear box helical gearing unit, and a circumference sprocket coupled to said reversible gear box; and coupling said large particle of mass to said tidal movement wave; and coupling said large particle of mass to one or more deep set, reinforced pylons 980.

In another aspect of the present embodiment as shown in FIG. 10, the method for providing nautical torque tidal movement power generation further comprises the large particle of mass coupled to said tidal movement wave wherein said large particle of mass is a minimum of 40,000 million tons configured to transfer the vessel's energy through a drive chain and turn sprocket system at a rate of five minutes per one inch, which will in turn rotate a second sprocket at a rate of 30 inches per five minutes which will transfer said energy to one or more power generating devices.

In certain aspects of the present embodiment shown in FIG. 10, the method provides steps for providing nautical torque tidal movement power generation wherein a reversible gear box is bolted to a pylon at the midway point between high and low tides to make a corresponding mark on the side of the hull of said bulk cargo vessel such that said mark corresponds with the gear box halfway between a first drive arm coupled to a first large particle of mass and a second drive arm coupled to a second large particle of mass, wherein said first and second drive arms are flush with said first and second sprockets such that said drive chain will fall plum around said second sprocket and fall plum to said lower drive arm and attached to lower drive arm with a first cotter pin.

In another aspect of the method for producing nautical torque tidal movement electrical power generation from tidal movement as shown in FIG. 11, steps may variously include in any order, adapting one or more electrical turbines to receive a first signal from said one or more tidal movement waves to generate one or more first electrical transmission signals; configuring at least one drive apparatus located remotely from said one or more turbines for receiving at least one said first electrical transmission signal; controlling the speed of rotation of the one or more electrical turbines to adjust the efficiency thereof; outputting at least one second electrical signal to supply electrical power generated by said turbine; configuring at least one feedback apparatus for providing at least one first control signal for use in controlling the speed of rotation of said turbine by at least one said drive apparatus to adjust the efficiency thereof; configuring at least one control apparatus for receiving at least one said second electrical transmission signal; and outputting at least one third electrical transmission signal to supply electrical power generated by said turbine, wherein at least one said control apparatus is adapted to control the frequency of at least one said third electrical transmission signal, and wherein at least one said feedback apparatus is adapted to apply at least one said first control signal that is responsive to the frequency of at least one said third electrical signal.

In another aspect of the present method illustrated in FIG. 12, the steps may variously include, in any order, generating at least two (2) megawatts electrical power renewable energy; and transmitting said at least two (2) megawatts of electrical power renewable energy.

Reference to the remaining portions of the specification, including the drawings and claims, will realize other features and advantages of the present invention. Further features and advantages of the present invention, as well as the structure and operation of various embodiments of the present invention, are described in detail below with respect to the accompanying drawings. In the drawings, like reference numbers indicate functionally similar elements.

DETAILED DESCRIPTION

Figure 1:
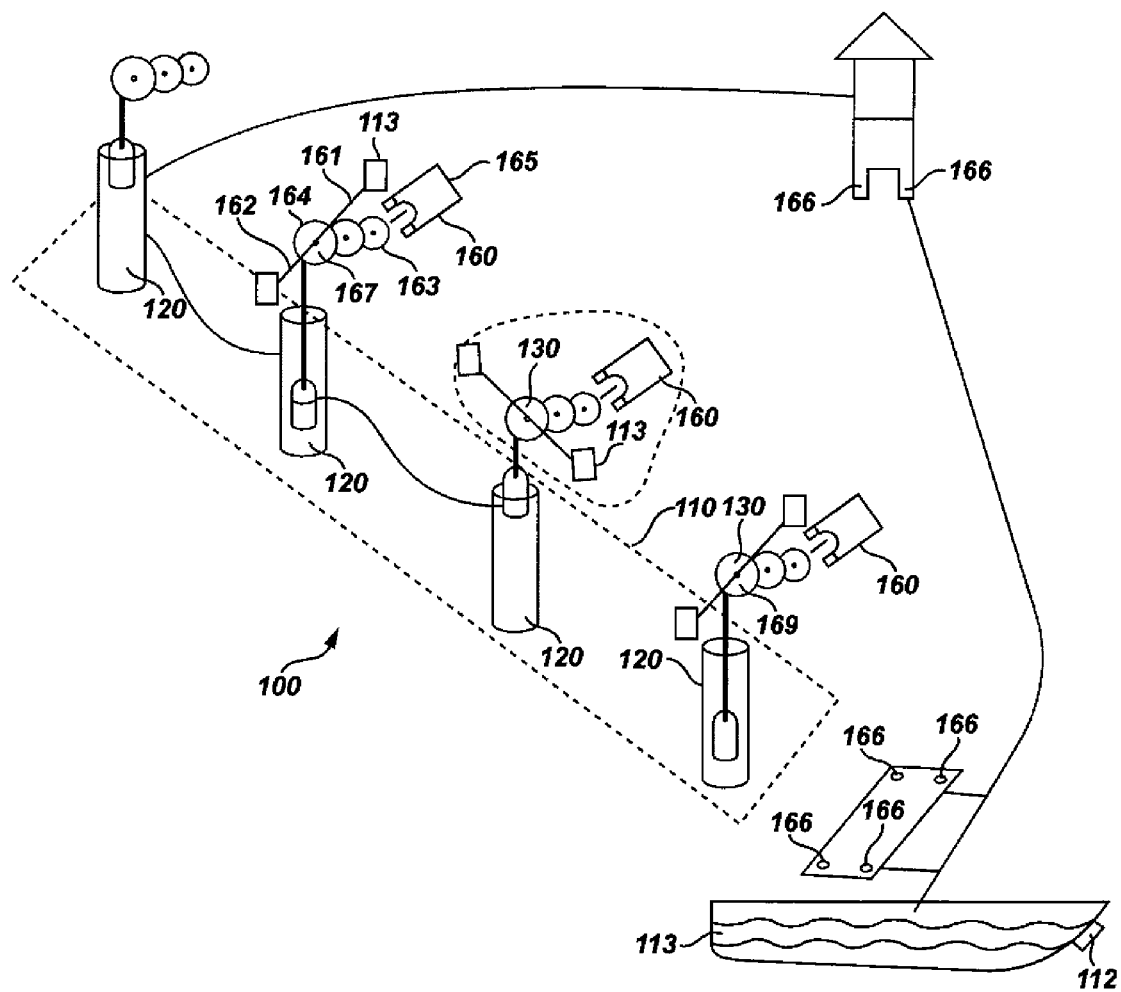
FIG. 1 illustrates a system for nautical torque tidal movement power generation.

In one embodiment as shown in FIG. 1, a system for nautical torque tidal movement power generation 100 comprises an arrangement 110 of one or more power generating devices 120; said arrangement 110 composed of said one or more devices 120 that are modular and electrically interconnected; said one or more power generating devices 120 operating independently of each other as components of said arrangement and wherein said devices are interchangeable with each other in a plurality of positions within said arrangement of said one or more power generating devices 120 is positioned to receive kinetic energy from the movement of water, and wherein said one or more power generating devices 120 convert said energy by the movement within each of said device; one or more 1800 RPM accelerator gear boxes 130 wherein said accelerator gear boxes 130 are mechanically coupled to one or more large particles of mass 113; at least one tidal movement wave 112 wherein said tidal movement wave 112 travels at a rate of substantially 1 foot per hour in a substantially vertical translation such that said large particles of mass 113 floating on a surface of said tidal movement wave 112 would travel a total of one foot per hour; a torque conversion unit 160 variously comprising an upper drive arm 161 coupled to a first counterbalance large particle of mass 113, a lower drive arm 162 coupled to a second counterbalance large particle of mass 113, one or more cotter pins 162, a circular sprocket 163, a lower free floating guide sprocket 164, a reversible gear box helical gear unit 165, one or more deep set, reinforced pylons 166 and a circumference sprocket 167 coupled to said reversible gear box 165; and variously a final large particle of mass 113c coupled to said tidal movement wave 112 wherein said large particles of mass 113 produce movement of 1 foot per hour in a substantially vertical direction and transmit an energy output to one or more electrical transmission power generating devices 120.

Figure 2:
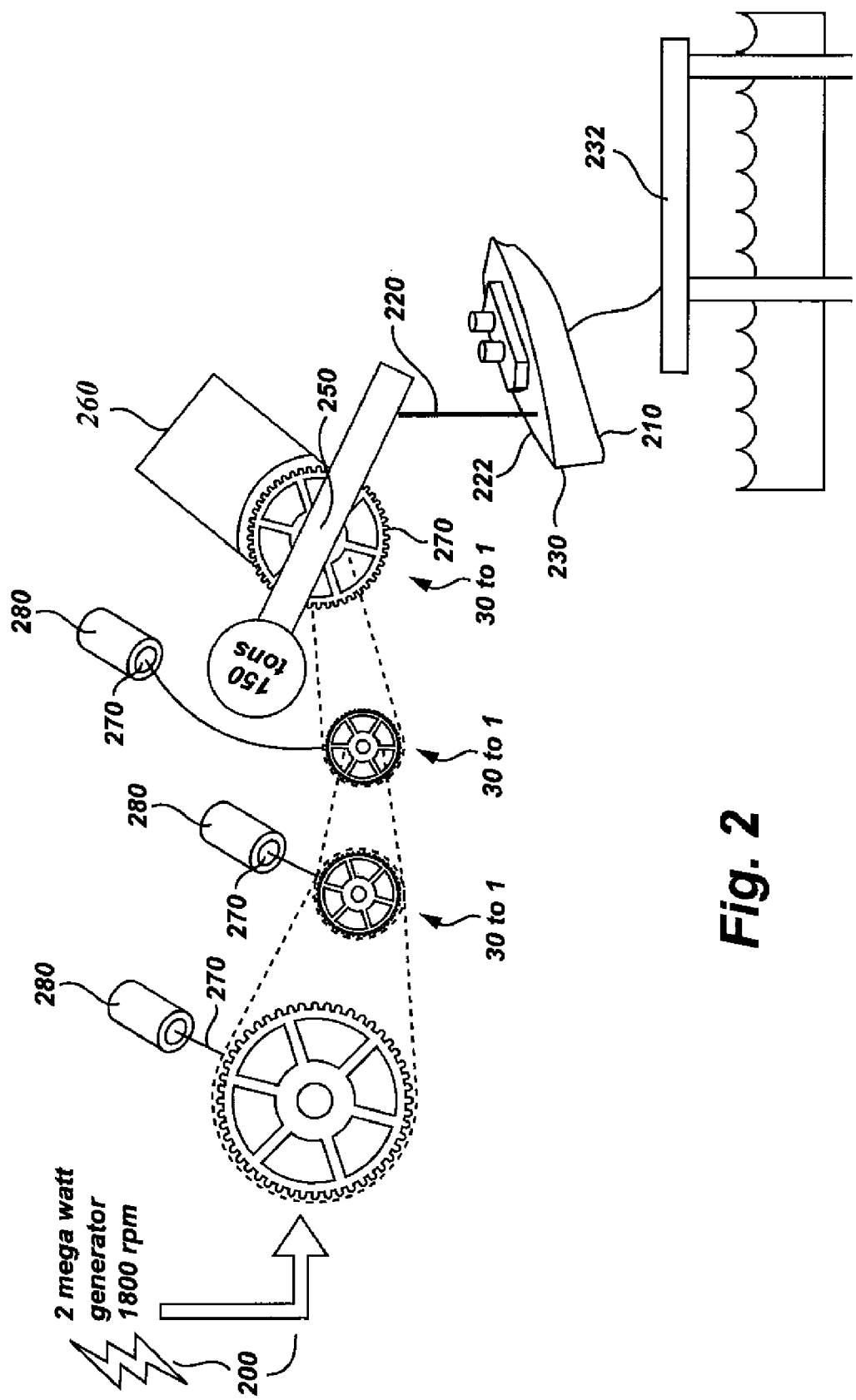
FIG. 2 illustrates an alternative system for nautical torque tidal movement power generation.

According to another aspect of the present embodiment as shown in FIG. 2, an alternative harborage 210 is located so as to be subject to fluctuating water levels, the harborage 210 having at least one port 220 for allowing water to ingress and egress; a vessel hull 230 located in the harborage 210, the hull 230 being free to move vertically as the water level inside of the harborage 210 rises and falls; a linear-to-rotary converter 250 integrally coupled to one or more components of said system for nautical torque tidal movement power generation 200 and at least part of said linear-to-rotary converter 250 which is coupled between the hull 230 and a fixed object 232, the converter 250 converting the vertical movement of the hull 210 into rotational movements and the port 220 having a valve 222 for adjusting the flow of water into and out of the harborage 210; an upper clamping linkage 260; and one or more successive cylinders 270 wherein said cylinders 270 are contained within one or more power generating devices 280.

Figure 3:
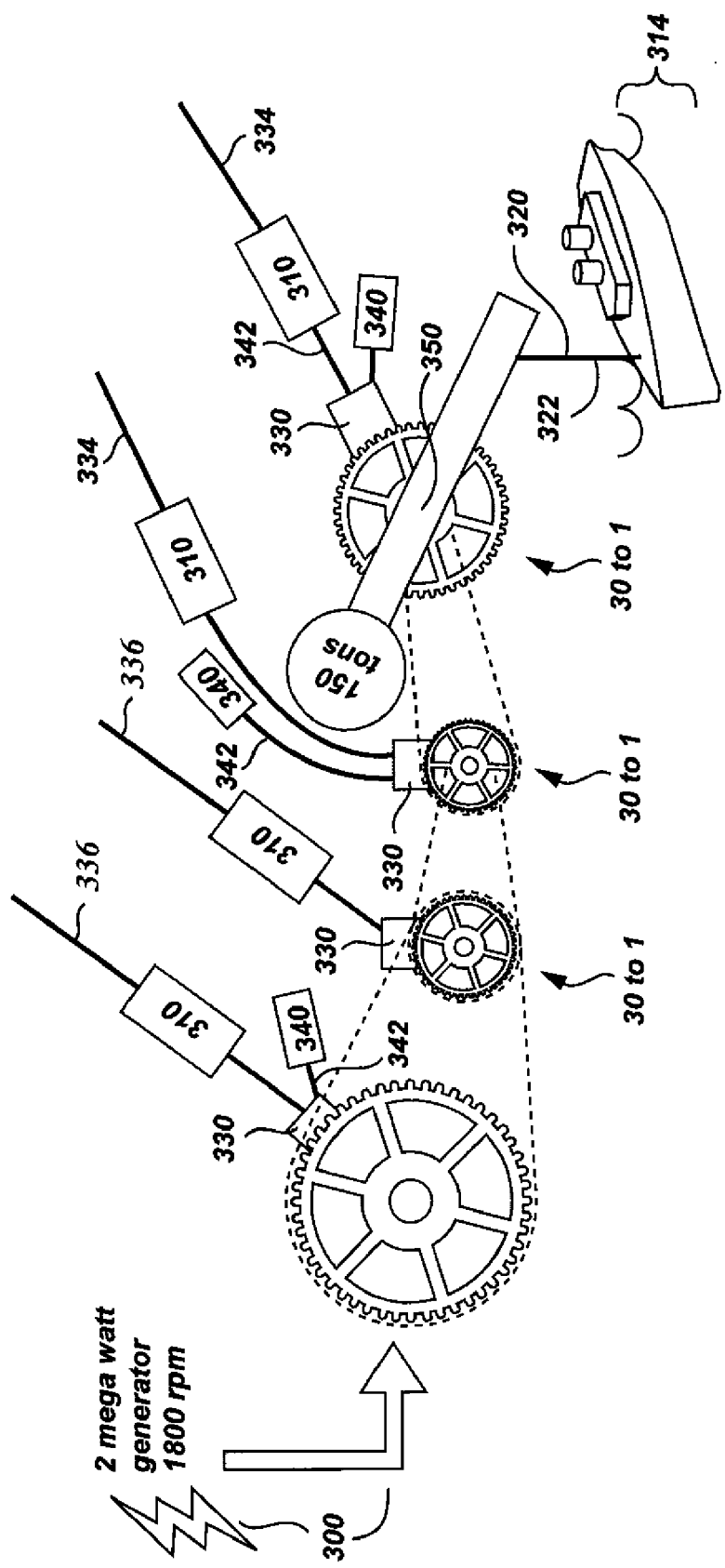
FIG. 3 illustrates an apparatus for producing nautical torque tidal movement electrical power generation from tidal movement.

In another aspect of the present embodiment as illustrated in FIG. 3, the apparatus for producing nautical torque tidal movement electrical power generation 300 from tidal movement further comprises at least one electrical turbine 310 adapted to receive a first signal 320 from said one or more tidal movement waves 314 to generate a first electrical transmission signal 322; at least one drive apparatus 330 located remotely from said turbine 310 configured for receiving at least one said first electrical transmission signal 322, controlling the speed of rotation of said turbine to adjust the efficiency thereof, and outputting at least one second electrical signal 334 to supply electrical power generated by said turbine 310; at least one feedback apparatus 340 for providing at least one first control signal 342 for use in controlling the speed of rotation of said turbine by at least one said drive apparatus 330 to adjust the efficiency thereof; and at least one control apparatus 350 for receiving at least one said second electrical transmission signal 334 and outputting at least one third electrical transmission signal 336 to supply electrical power generated by said turbine 310, wherein at least one said control apparatus 350 is adapted to control the frequency of at least one said third electrical transmission signal 336, wherein at least one said feedback apparatus 340 is adapted to apply at least one said first control signal 342 responsive to the frequency of at least one said third electrical signal 336.

Figure 4:
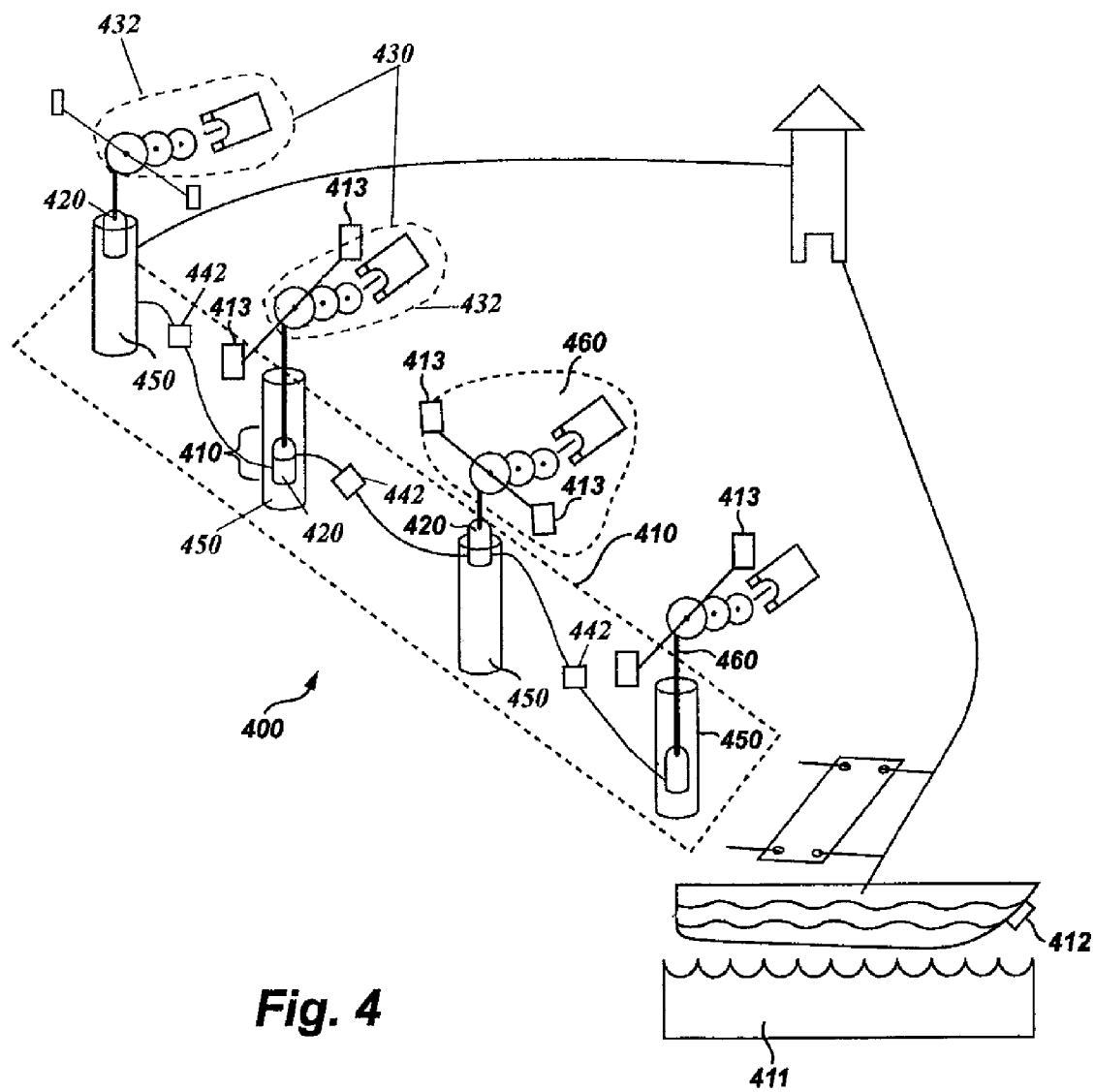
FIG. 4 illustrates an apparatus for producing nautical torque tidal movement electrical power generation from tidal movement including a moveable tank system.

In certain other aspects of the present embodiment, as illustrated in FIG. 4, the apparatus for producing nautical torque tidal movement electrical power generation 400 may variously further include a moveable tank system 425 associated with one or more hydraulic cylinders 420 in which the upward and downward movements of the tank 410 relative to the tide 412 from a surrounding body of water 411 are used to generate nautical torque tidal movement electrical power generation from tidal movement; an enclosure system 430 in which the controlled inflow and outflow of water between one or more enclosures 432 and a surrounding body of water 411 is used to generate nautical torque tidal movement electrical power generation from tidal movement; a bellows system 440 in which the effects of the tidal movements are used to force water from the bellows tank 442 through one or more power generating devices 450; and a buoyant mass-actuated piston system 460 in which the movement of one or more floating large particle of mass objects 413 relative to the tide 412 is used to generate nautical torque tidal movement electrical power generation from tidal movement.

Figure 5:
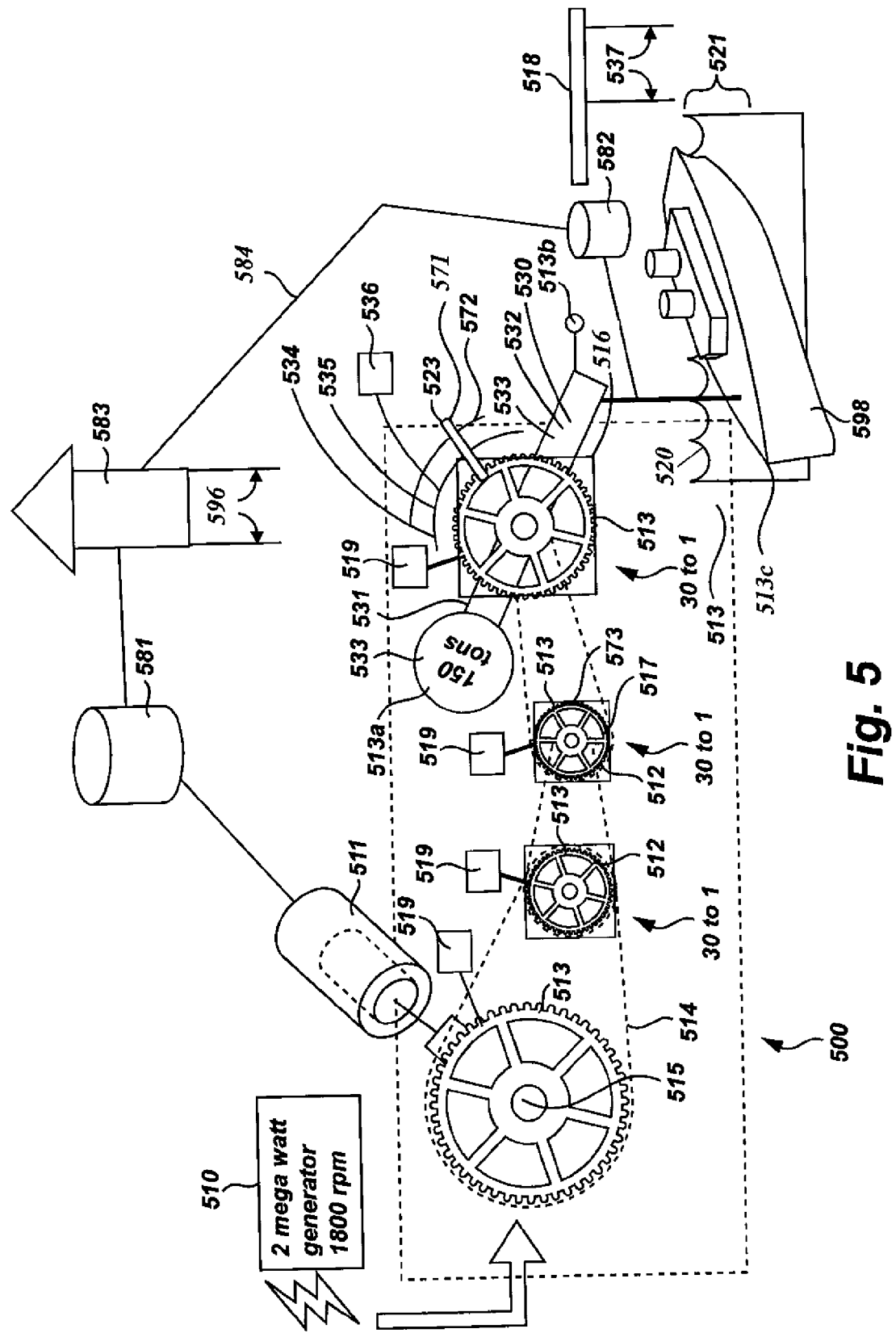
FIG. 5 illustrates an apparatus for producing nautical torque tidal movement electrical power generation from tidal movement including one or more electrical turbines, control systems, and feedback systems.

In another embodiment, as illustrated in FIG. 5, an apparatus for generating nautical torque tidal movement electrical power generation from tidal movement 500 comprises a power device generator 510 including a turbine 511 that operates at a minimum of 240 rpm; at least one industrial gear housing 512 comprising one or more sprockets 523 coupled to one or more linked chains 514 rotating about a pivot point 515 wherein the rate of the chain of a first industrial gear housing is at a rate of substantially 900 inches per five minutes and the rate of the chain of a second industrial gear housing 517 is at a rate of substantially 27,000 inches per five minutes; and said at least one industrial gear housing 516 is coupled to a dock 518 and indirectly to a plurality of 1800 RPM accelerator gear boxes 519 wherein said accelerator gear boxes 519 are mechanically coupled to one or more large counterbalance particles of mass 513; at least one tidal movement wave 520 wherein said tidal movement wave 520 travels at a rate of substantially one foot per hour in a substantially vertical translation 521 such that said large particles of mass 513 floating on a surface of said tidal movement wave 520 would travel a total of one foot per hour; a torque conversion unit 530 variously comprising an upper drive arm 531 coupled to a first counterbalance large particle of mass 513a, a lower drive arm 532 coupled to a second counterbalance large particle of mass 513b, one or more cotter pins 533, a circular sprocket 534, a lower free floating guide sprocket 535, a reversible gear box helical gearing unit 536, one or more deep set, reinforced pylon fixed stationary locations 537 and a circumference sprocket coupled to said reversible gear box 536; and a final large particle of mass 513c coupled to said tidal movement wave 520 wherein said large particles of mass 513 are configured to produce a minimum of one foot per hour of travel in said one or more mass actuated pistons transferring kinetic energy in one or more power generating devices 510 producing a minimum of one or more two megawatt electrical generators operating at 1800 RPM.

Another aspect of the present embodiment further illustrated in FIG. 5, includes an apparatus for generating nautical torque tidal movement electrical power generation from a land locked design including tidal movement 500 from one or more large particles of mass 513 wherein said large particles of mass 513 are coupled to said tidal movement wave 520 wherein said large particles of mass 513a, 513b are further coupled to said one or more torque conversion units 530 configured to transfer kinetic energy through a system variously comprising a drive chain 571 and said torque conversion units 530 further configured to turn a first sprocket 572 at a rate of five minutes per one inch, which will in turn rotate a second sprocket 572 at a rate of 30 inches per five minutes, which will in turn rotate subsequent sprockets 572 at a rate of 27,000 inches per five minutes at a 30:1 ratio which will transfer said energy to one or more power generating devices 510 coupled to one or more 1800 RPM accelerators 519 to produce one or more two megawatt electric power generators operating at substantially 1800 RPM and wherein said apparatus is finally coupled to a natural feed first upper holding reservoir 581, an upper water source holding reservoir 583, a lower holding tank water source 582, a pumped water return line 584 and a stationary deep, pylon anchor location 596 wherein said system is capable of producing electrical power in either landlock natural water feed tide movement mode or in vessel dock tide movement mode.

Another aspect of the present embodiment of the apparatus for generating nautical torque tidal movement electrical power generation from tidal movement shown in FIG. 5, comprises one or more power device generators 510 in an arrangement of one or more turbines 511 per power device generator 510 wherein said electrical turbines each operates at a minimum of 240 rpm; at least one industrial gear housing 512 comprising one or more sprockets 523 coupled to one or more linked chains 514 rotating about a pivot point 515 wherein said speed of a first industrial gear housing 512 is at a rate of substantially 900 inches per five minutes and a second industrial gear housing 512 is at a rate of substantially 27,000 inches per five minutes; and said at least one industrial gear housing 512 is coupled to a stationary fixed anchor location 596 and a plurality of 1800 RPM accelerator gear boxes 519 wherein the reversible gear box 536 is indirectly coupled to one or more pylons 537, each at the midway point between high and low tides to make a corresponding mark 598 on the side of the hull of said bulk cargo vessel such that said mark corresponds with the gear box halfway between the first drive arm 531 coupled to a first counterbalance large particle of mass 513a and the second drive arm 532 coupled to a second counterbalance large particle of mass 513b, wherein said first and second drive arms 531, 532 are flush with said first and second sprockets 534, 535 such that said drive chains 514 will fall plum around said second sprocket 535 and fall plum to said lower drive arm 531 and be attached to said lower drive arm 531 with said cotter pin 533.

Figure 6:
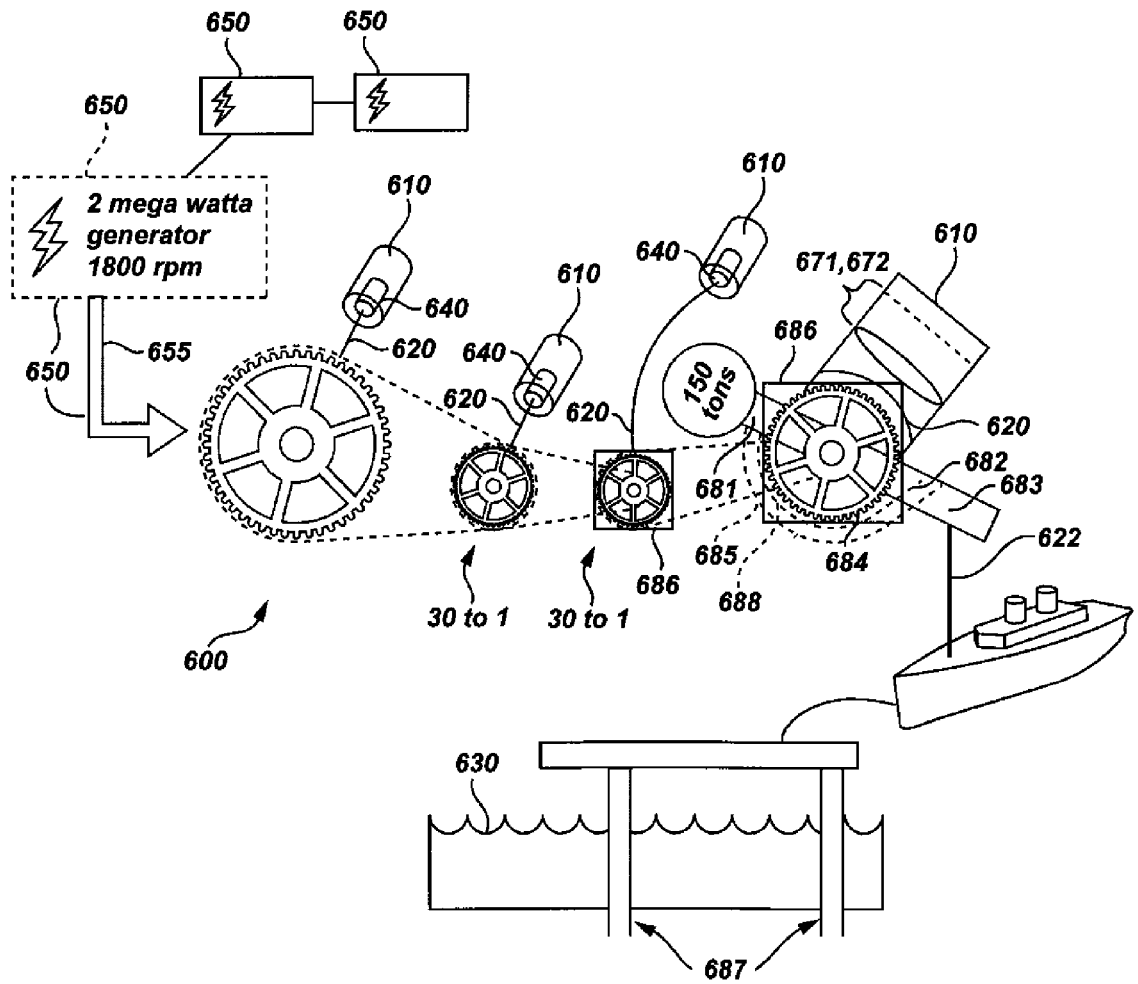
FIG. 6 shows an apparatus that comprises one or more electrical turbines adapted to receive one or more signals from one or more tidal movement waves.

In another embodiment, as illustrated in FIG. 6, a nautical torque tidal movement power generation apparatus 600 comprises one or more electrical turbines 610 adapted to receive a first signal 620 from one or more tidal movement waves 630 to generate a first electrical transmission signal 622 wherein said signal transmits kinetic energy from said one or more tidal movement waves 630 from a mass-actuated piston 640; one or more power generating devices 650; said one or more power generating devices 650 coupled in an electrically interconnected modular arrangement 655; said one or more power generating devices 650 operating independently of each other as components of a tidal movement power generation apparatus 600 wherein said devices are interchangeable with each other in a plurality of positions within said arrangement 655; said one or more power generating devices 650 are positioned to receive kinetic energy from the movement of water, and wherein said devices convert said energy by the movement within each of said device from a first vertical position 671 to a second vertical position 672; a torque conversion unit upper drive arm 681; a torque conversion lower drive arm 682; one or more cotter pins 683; a circular sprocket 684; a lower free floating guide sprocket 685; a reversible gear box helical gearing unit 686; one or more deep set, reinforced pylons 687; and a circumference sprocket 688 coupled to said reversible gear box 686.

In various aspects of the present embodiment the one or more electrical turbines 610 move at a minimum rate of 240 RPM.

Figure 7:
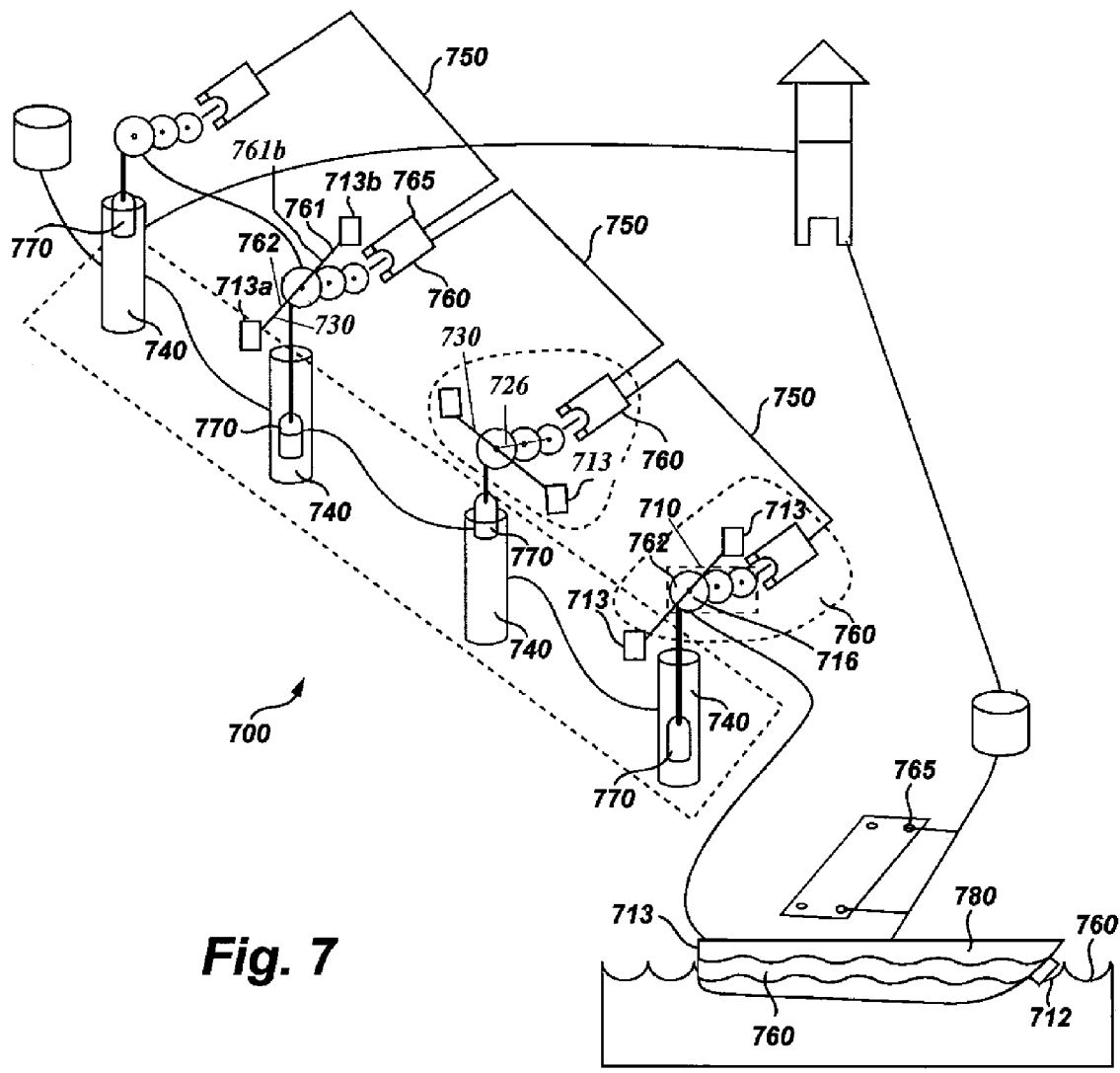
FIG. 7 shows a nautical torque tidal movement power generation apparatus that further comprises sprockets, industrial bearing houses and one or more thirty pound (30-lb) buckets.

In yet another embodiment as shown in FIG. 7, the nautical torque tidal movement power generation apparatus 700 comprises an accelerator gear assembly 760 including plurality of sprockets 730 that are mechanically coupled to a plurality of industrial gear house assemblies 765 and a first series of one or more chains 726; one or more large particles of mass 713 mechanically coupled to a second series of one or more chains 726; the one or more mechanically coupled chains 726 mechanically coupled to a first set of one or more drive arms 730; the first set of one or more drive arms 730 pivotally coupled to a second set of one or more drive arms 761, 762 to form a drive arm assembly 761b, said drive arm assembly 761b coupled to said first and second counterbalance large particles of mass 713a, 713b; said drive arm assembly 731b fluidly coupled to one or more cylinders 740 coupled to one or more signals 750 to transmit kinetic energy from one or more tidal movement waves 760 from a mass-actuated piston 770.

In another aspect of the present embodiment shown in FIG. 7, the nautical torque tidal movement power generation apparatus 700 further comprises the plurality of sprockets 710 that are mechanically coupled to a plurality of industrial gear house assemblies 765 and a first series of one or more chains 716; one or more large particles of mass 713 mechanically coupled to a second series of one or more chains 726; one or more mechanically coupled chains 716, 726 mechanically coupled to one or more drive arms 761, 762; the first set of one or more drive arms 761, 762 pivotally coupled to a second set of one or more drive arms 761, 762 to form a drive arm assembly 761b, said drive arm assembly 761b coupled to said first and second counterbalance large particles of mass 713a, 713b; said drive arm assembly 761b fluidly coupled to one or more cylinders 740 that are coupled to one or more signals 750 to transmit kinetic energy from said one or more tidal movement waves 760 from the mass-actuated piston 770 wherein the one or more electrical turbines 772 move at a minimum rate of 240 rpm to generate at least two megawatts of electrical power and are mechanically coupled to one or more final large particles of mass 780.

Figure 8:
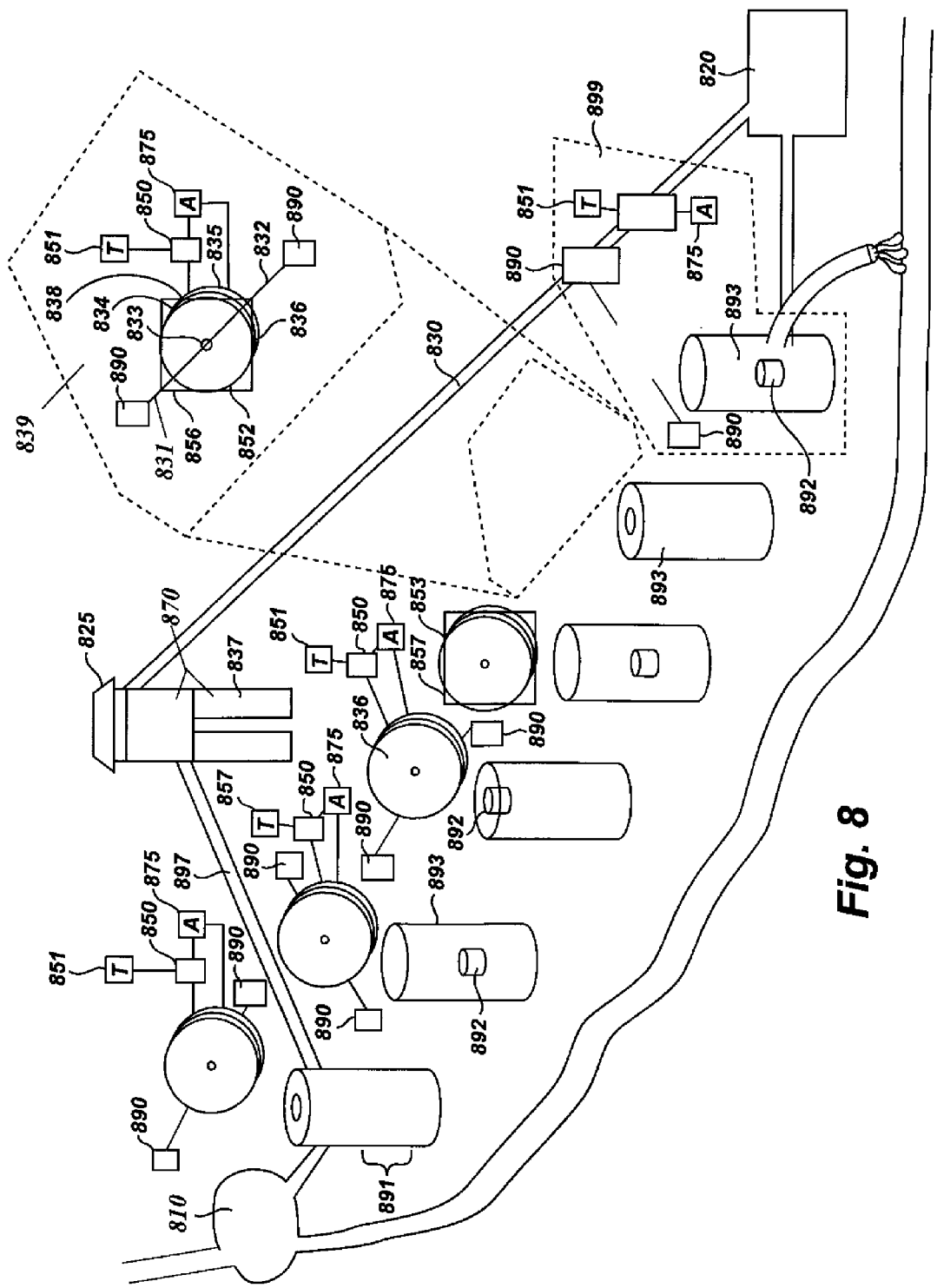
FIG. 8 illustrates a nautical torque tidal movement power generation system that utilizes a land locked design.

In another embodiment as illustrated in FIG. 8, a nautical torque land lock design 800 comprises a natural water feed upper reservoir first water source 810, a lower water holding tank second water source 820, a water return line 830 wherein water in said lower water holding tank second water source 820 is pumped back to a second upper water source holding reservoir 825 and one or more a power device generators 850 further comprising an electrical turbine 851, a plurality of industrial gear housing assemblies 852, 853 including at least a first industrial gear housing 856 and second industrial gear housing 857 that comprises one or more sprockets 838 coupled to one or more linked chains rotating about a pivot point 833 wherein said speed of said first industrial gear housing 856 is at a rate of substantially 900 inches per five minutes and a second industrial gear housing 857 is at a rate of substantially 27,000 inches per five minutes; one or more power generation components 899 including a cylinder 893, a mass actuated piston 892, and one or more torque conversion units 839; and said plurality of industrial gear housings are coupled to a plurality of 1800 RPM accelerator gear boxes 875 wherein said accelerator gear boxes 875 are mechanically coupled to one or more large particles of mass 890; at least one land lock tidal movement wave 891 wherein said tidal movement wave travels at a rate of substantially one foot per hour in a substantially vertical translation such that said large particles of mass 890 floating on a surface of said tidal movement wave would travel a total of one foot per hour, wherein said large particles of mass 890 are configured to produce one foot per hour travel in one or more power generating devices 850; and variously coupled to a fixed anchor structure 870 providing gravity feed water line 897 to one or more power generation components 899 and a mass actuated piston 892 hydraulically operating on a column height of water in said cylinder 893 traveling a distance equal to land lock tidal wave movement 891 equivalent of substantially one foot per hour in said substantially vertical translation 891.

In another embodiment as illustrated in FIG. 8, the nautical torque land lock design 800 further comprises a torque conversion unit 839 variously including an upper drive arm 831, a lower drive arm 832, one or more cotter pins 833, a circular sprocket 834, a lower free floating guide sprocket 835, a reversible gear box helical gearing unit 836, one or more deep set, reinforced pylons 837 and a circumference sprocket 838 coupled to said reversible gear box helical gearing unit 836; and the one or more large particles of mass 890 coupled to said tidal movement wave 891 wherein said one or more large particles of mass 890 is a minimum total of 200 million tons. In other aspects, the one or more large particles of mass may be sufficient to drive a mass actuated piston 892 with hydraulic force to generate cumulatively a minimum of one foot per hour vertical translation per power generating device.

Figure 9:
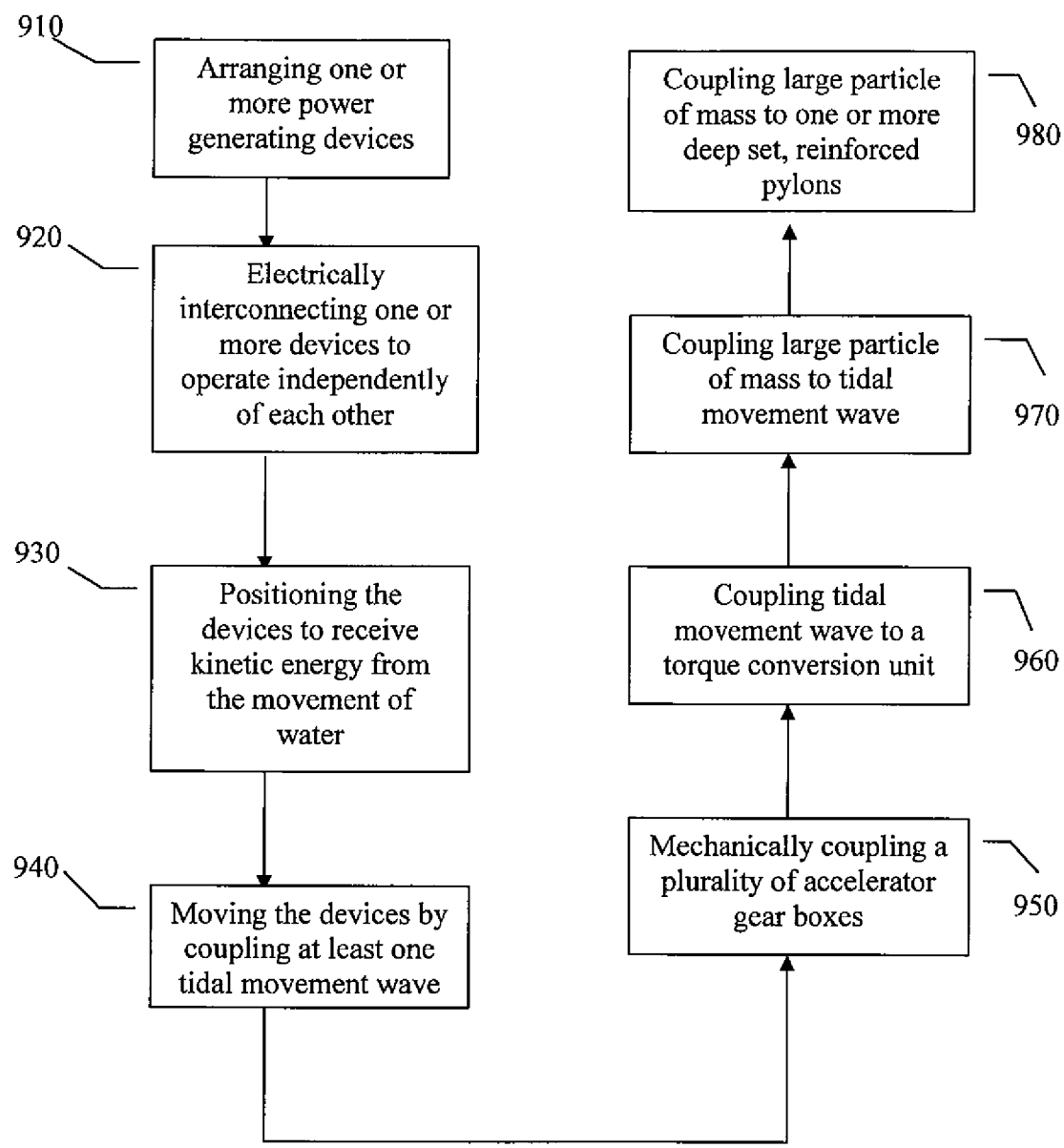
In FIG. 9, a method for providing nautical torque tidal movement power generation is shown.

In another embodiment, as illustrated in FIG. 9, a method for providing nautical torque tidal movement power generation 900 comprises the steps of arranging one or more power generating devices 910; electrically interconnecting said one or more devices to operate independently of each other 920; positioning said devices to receive kinetic energy from the movement of water 930, wherein said devices convert said energy by the movement within each of said device; moving said devices by coupling at least one tidal movement wave 940 wherein said tidal movement wave travels at a rate of substantially 1 foot per hour in a substantially vertical direction such that a large particle of mass floating on a surface of said tidal movement wave would travel a total of one foot per hour; mechanically coupling a plurality of 1800 RPM accelerator gear boxes 950 wherein said accelerator gear boxes are mechanically coupled to said large particle of mass; coupling said tidal movement wave to a torque conversion unit 960 comprising an upper drive arm, a lower drive arm, one or more cotter pins, a circular sprocket, a lower free floating guide sprocket, a reversible gear box helical gearing unit, and a circumference sprocket coupled to said reversible gear box; and coupling said large particle of mass 970 to said tidal movement wave wherein said large particle of mass is a minimum of 200 million tons; and coupling said large particle of mass to one or more deep set, reinforced pylons 980.

Figure 10:
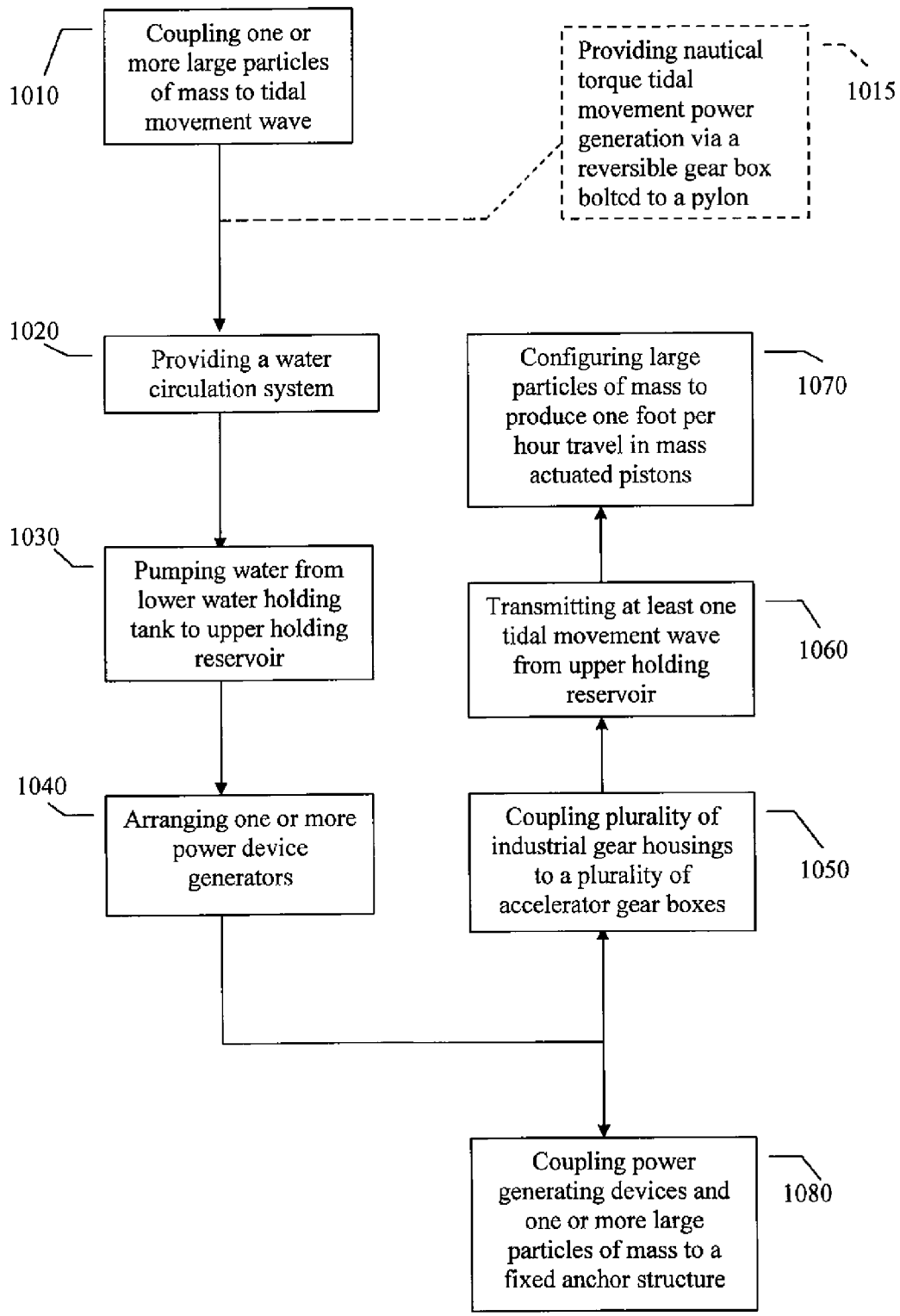
FIG. 10 illustrates further variations for providing nautical torque movement power generation steps.

In another aspect of the present embodiment as shown in FIG. 10, the method 1000 for providing nautical torque tidal movement power generation further comprises coupling 1010 one or more large particles of mass to said tidal movement wave wherein said large particle of mass is a minimum total mass of 200 million tons and configuring said power generation d to transfer the vessel's energy through a drive chain and a turn sprocket at a rate of five minutes per one inch, which will in turn rotate a second sprocket at a rate of 30 inches per five minutes which will transfer said energy to one or more power generating devices that are configured in a land lock design; providing a water circulation system 1020 comprising a first water source 810, a second water source 820, and a water return line 830; pumping water 1030 in the lower water holding tank to a second water source upper holding reservoir 825; arranging 1040 one or more power device generators 850 further comprising an electrical turbine 851, a plurality of industrial gear housings 852, 853 including at least a first industrial gear housing 856 and second industrial gear housing 857 that comprises one or more sprockets 858 coupled to one or more linked chains 859, rotating about a pivot point 860 wherein said speed of said first industrial gear housing 856 is at a rate of substantially 900 inches per five minutes and a second industrial gear housing 857 is at a rate of substantially 27,000 inches per five minutes; and coupling said plurality of industrial gear housings 1050 to a plurality of 1800 RPM accelerator gear boxes 875 wherein said accelerator gear boxes 875 are mechanically coupled to one or more large particles of mass 890; transmitting 1060 at least one tidal movement wave 891 from said upper holding reservoir 825 wherein said at least one tidal movement wave 891 travels at a rate of substantially one foot per hour in a substantially vertical translation such that said large particles of mass 890 floating on a surface of said tidal movement wave would travel a total of one foot per hour; configuring 1070 said large particles of mass 890 to produce one foot per hour travel in one or more mass actuated pistons; and coupled to one or more power generating devices 850. In other various aspects, the method may include a step for coupling 1080 said one or more power generating devices 850 and said one or more large particles of mass 890 to a fixed anchor structure 870.

In certain aspects of the present embodiment shown in FIG. 10, the method provides steps 1015 for providing nautical torque tidal movement power generation wherein a reversible gear box is bolted to a pylon at the midway point between high and low tides to make a corresponding mark on the side of the hull of said bulk cargo vessel such that said mark corresponds with the gear box halfway between a first drive arm and a second drive arm, wherein said first and second drive arms are flush with said first and second sprockets such that said drive chain will fall plum around said second sprocket and fall plum to said lower drive arm and attached to lower drive arm with a first cotter pin.

Figure 11:
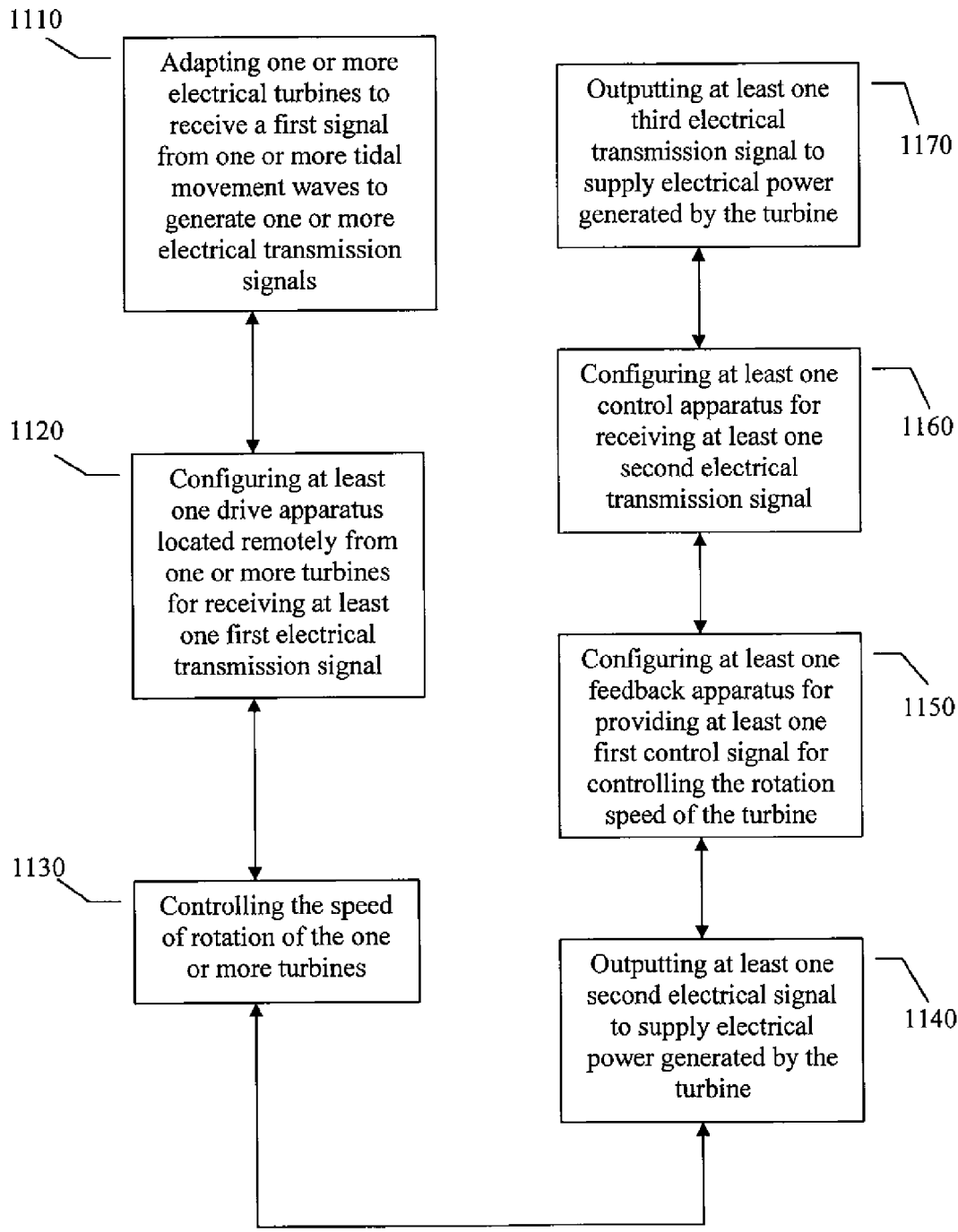
FIG. 11 illustrates a further method for providing nautical torque movement power generation steps.

In another aspect of the method for producing nautical torque tidal movement electrical power generation from tidal movement as shown in FIG. 11, steps 1100 may variously include in any order, adapting one or more electrical turbines to receive a first signal from said one or more tidal movement waves 1110 to generate one or more first electrical transmission signals; configuring at least one drive apparatus located remotely from said one or more turbines 1120 for receiving at least one said first electrical transmission signal; controlling the speed of rotation of the one or more electrical turbines 1130 to adjust the efficiency thereof; outputting at least one second electrical signal to supply electrical power generated by said turbine 1140; configuring at least one feedback apparatus 1150 for providing at least one first control signal for use in controlling the speed of rotation of said turbine by at least one said drive apparatus to adjust the efficiency thereof; configuring at least one control apparatus for receiving at least one said second electrical transmission signal 1160; and outputting at least one third electrical transmission signal to supply electrical power generated by said turbine 1170, wherein at least one said control apparatus is adapted to control the frequency of at least one said third electrical transmission signal, and wherein at least one said feedback apparatus is adapted to apply at least one said first control signal that is responsive to the frequency of at least one said third electrical signal.

Figure 12:
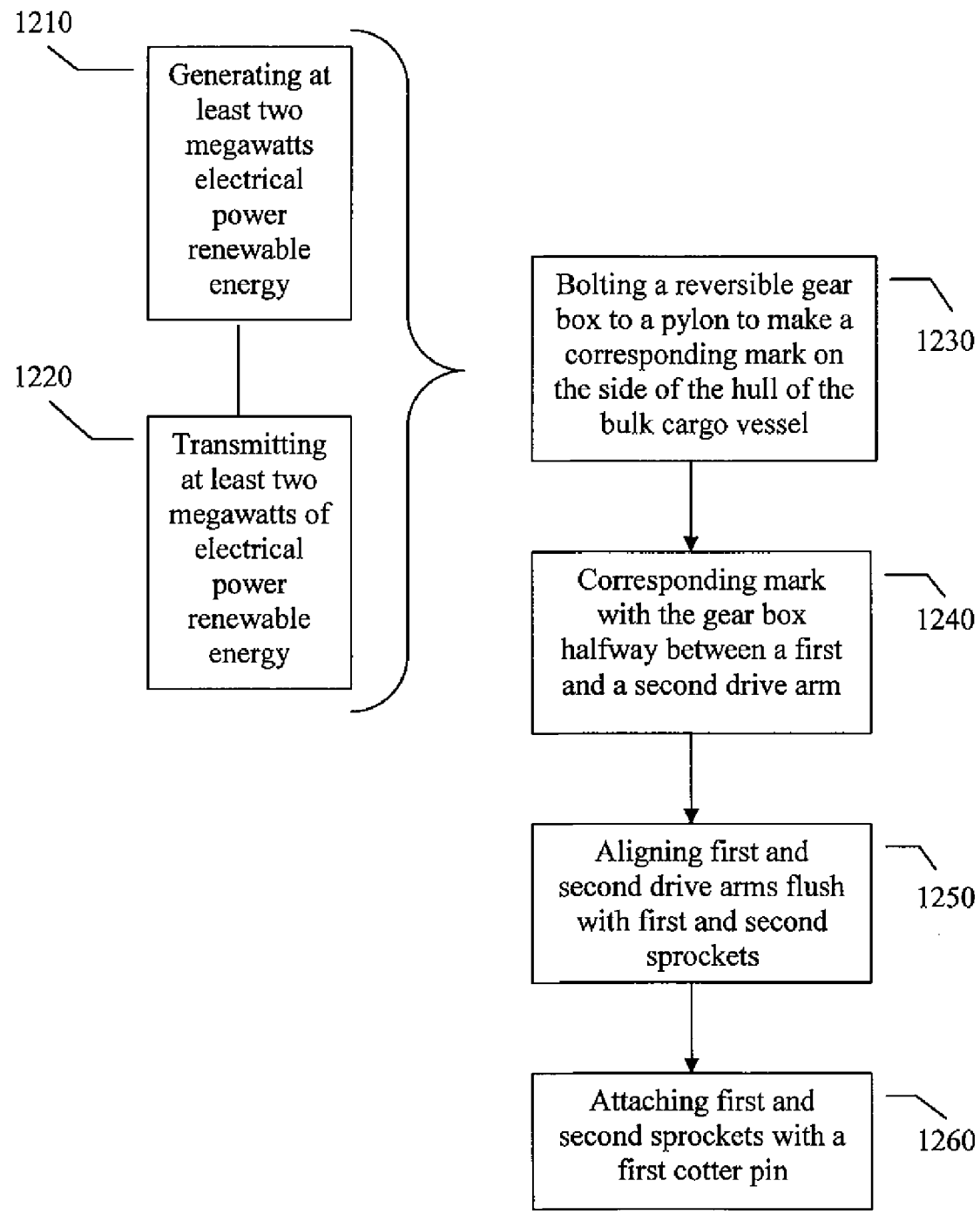
FIG. 12 illustrates variations for providing nautical torque movement power generation steps.

In another aspect of the present method illustrated in FIG. 12, the steps 1200 may variously include, in any order, generating at least two (2) megawatts electrical power renewable energy 1210; and transmitting said at least two (2) megawatts of electrical power renewable energy 1220.

In certain aspects of the present embodiment illustrated in FIG. 12, the method 1200 further provides steps for providing nautical torque tidal movement power generation including bolting a reversible gear box to a pylon at the midway point between high and low tides 1230 to make a corresponding mark on the side of the hull of said bulk cargo vessel; corresponding said mark with the gear box halfway between a first drive arm and a second drive arm 1240; aligning said first and second drive arms flush with said first and second sprockets 1250 such that said drive chain will fall plum around said second sprocket and fall plum to said lower drive arm; and attaching said first and second sprockets of said lower drive arm with a first cotter pin 1260.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

Although the invention is illustrated and described herein as embodied in one or more specific examples, it is nevertheless not intended to be limited to the details shown, since various modifications and structural changes may be made therein without departing from the spirit of the invention and within the scope and range of equivalents of the claims. Accordingly, it is appropriate that the appended claims be construed broadly and in a manner consistent with the scope of the invention, as set forth in the following claims.

What is claimed is:

1. A system for nautical torque tidal movement power generation comprising:

an arrangement of power generating devices, said arrangement composed of said devices in an independently electrically interconnected modular arrangement, said devices operating independently of each other as components of said arrangement and wherein said devices are capable of electrical communication between each other within said arrangement, wherein said devices are interchangeable with each other in a plurality of positions within said arrangement, and wherein said devices are positioned to receive kinetic energy from the movement of water, and wherein said devices convert said energy by the movement within each of said device;

a plurality of 1800 RPM accelerator gear boxes wherein said accelerator gear boxes are mechanically coupled to one or more large particles of mass through one or more torque conversion units;

each of said torque conversion units comprising an upper drive arm coupled to a first counterbalance large particle of mass weighing at least 150 tons, a lower drive arm coupled to a floating second counterbalance large particle of mass which floats synchronously on a tide and travels in a substantially vertical translation with said tide at a rate of substantially one foot per hour, said drive arms coupled to a circular sprocket, wherein the continuous upward and downward movement of the floating large particle of mass produces a continuous rotational movement of the circular sprocket through the accelerator gear box, wherein energy is generated from all vertical movements of the large particles of mass, one or more cotter pins, a lower free floating guide sprocket, a reversible gear box helical gearing unit, one or more deep set, reinforced pylons and a circumference sprocket coupled to said reversible gear box; and one or more final large particles of mass coupled to said tidal movement wave wherein said large particle of mass is configured to produce a minimum torque to drive one or more power generating devices.

2. The system of claim 1, further comprising:

a harborage located so as to be subject to fluctuating water levels, the harborage having at least one port for allowing water to ingress and egress;

a vessel hull located in the harborage, the hull being free to move vertically as the water level inside of the harborage rises and falls;

a linear-to-rotary converter, at least part of which is coupled between the hull and a fixed object, the converter converting the vertical movement of the hull into rotational movements;

the port having a valve for adjusting the flow of water into and out of the harborage;

an upper clamping linkage; and one or more successive cylinders wherein said cylinders are contained within said power generating devices.

3. The system of claim 1, further comprising:

an apparatus for producing nautical torque tidal movement electrical power generation from tidal movement, comprising at least one electrical turbine adapted to receive a first signal from said one or more tidal movement waves to generate a first electrical transmission signal;

at least one drive apparatus located remotely from said turbine configured for receiving at least one said first electrical transmission signal, controlling the speed of rotation of the or each said turbine to adjust the efficiency thereof, and outputting at least one second electrical signal to supply electrical power generated by said turbine;

at least one feedback apparatus for providing at least one first control signal for use in controlling the speed of rotation of said turbine by at least one said drive apparatus to adjust the efficiency thereof;

and at least one control apparatus for receiving at least one said second electrical transmission signal and outputting at least one third electrical transmission signal to supply electrical power generated by said turbine, wherein at least one said control apparatus is adapted to control the frequency of at least one said third electrical transmission signal, wherein at least one said feedback apparatus is adapted to apply at least one said first control signal responsive to the frequency of at least one said third electrical signal.

4. The system of claim 1, further comprising:

a moveable tank system associated with hydraulic cylinders in which the upward and downward movements of the tank relative to the tide are used to generate nautical torque tidal movement electrical power generation from tidal movement;

an enclosure system in which the controlled inflow and outflow of water between the enclosure and the surrounding body of water is used to generate nautical torque tidal movement electrical power generation from tidal movement;

a bellows system in which the effects of the tidal movements are used to force water from the bellows tank through said power generating devices; and a buoyant mass-actuated piston system in which the movement of floating objects (such as docked ships) relative to the tide is used to generate nautical torque tidal movement electrical power generation from tidal movement.

5. An apparatus for generating nautical torque tidal movement electrical power generation from tidal movement comprising:

an arrangement of power generating devices, said arrangement composed of said devices in an independently electrically interconnected modular arrangement, said devices operating independently of each other as components of said arrangement and wherein said devices are capable of electrical communication between each other within said arrangement, wherein said devices are interchangeable with each other in a plurality of positions within said arrangement, and wherein said devices are positioned to receive kinetic energy from the movement of water, and wherein said devices convert said energy by the movement within each of said device;

said each power device generator comprising a turbine that operates at a minimum of 240 rpm;

at least one industrial gearing housing comprising one or more sprockets coupled to one or more linked chain rotating about a pivot point wherein said speed of said first industrial gearing housing is at a rate of substantially 900 inches per five minutes and a second industrial gearing housing is at a rate of substantially 27,000 inches per five minutes resulting in a gear ratio of 30:1;

said at least one industrial gearing housing is coupled to a dock and a plurality of 1800 RPM accelerator gear boxes wherein said accelerator gear boxes are mechanically coupled to a one or more large particles of mass through one or more torque conversion units;

wherein each of said a torque conversion units each comprising an upper drive arm coupled to a first counterbalance large particle of mass weighing at least 150 tons, a lower drive arm a floating second large particle of mass coupled to said tidal movement wave wherein said large particle of mass is 40,000 tons and floats synchronously on a tide and travels in a substantially vertical translation with said tide at a rate of substantially one foot per hour, said drive arms coupled to a circular sprocket, wherein the continuous upward and downward movement of the floating large particle of mass produces a continuous rotational movement of the circular sprocket through the accelerator ear box causing up to 1800 revolutions per minute, wherein energy is generated from all vertical movements of the large particles of mass, one or more cotter pins, a lower free floating guide sprocket, a reversible gear box helical gearing unit, one or more deep set, reinforced pylons and a circumference sprocket coupled to said reversible gear box;

wherein the apparatus is capable of generating and transmitting at least two (2) megawatts electrical power renewable energy.

6. The apparatus of claim 5 wherein said large particle of mass is a bulk cargo vessel coupled to said tidal movement wave wherein said large particle of mass is configured to transfer the vessel's energy through a drive chain and a turn sprocket at a rate of one inch per five minutes, which will in turn rotate a second sprocket at a rate of 30 inches per five minutes which will transfer said energy to one or more power generating devices.

7. The apparatus of claim 6 wherein a reversible gear box is bolted to a pylon at the midway point between high and low tides to make a corresponding mark on the side of the hull of said bulk cargo vessel such that said mark corresponds with the gear box halfway between a first drive arm and a second drive arm, wherein said first and second drive arms are flush with said first and second sprockets such that said drive chain will fall plum around said second sprocket and fall plum to said lower drive arm and attached to lower drive arm with a first cotter pin.

8. A nautical torque tidal movement power generation system comprising:
   at least one electrical turbine adapted to receive a first signal from one or more tidal movement waves to generate a first electrical transmission signal wherein said signal transmits kinetic energy from said one or more tidal movement waves from a mass-actuated piston;
   one or more power generating devices, said devices coupled in an independently electrically interconnected modular arrangement, wherein said devices are capable of electrical communication between each other within said arrangement, and wherein said devices operating independently of each other as components of a tidal movement power generation apparatus, and wherein said devices are interchangeable with each other in a plurality of positions within said arrangement; said devices are positioned to receive kinetic energy from the movement of water, and wherein said devices convert said energy by the movement within each of said device from a first vertical position to a second vertical position;
   a torque conversion unit upper drive arm coupled to a first counterbalance large particle of mass weighing at least 150 tons;
   a torque conversion lower drive arm coupled to a floating second large particle of mass which floats synchronously on a tide and travels in a substantially vertical translation with said tide at a rate of substantially one foot per hour, said drive arms coupled to a circular sprocket, wherein the continuous upward and downward movement of the floating large particle of mass produces a continuous rotational movement of the circular sprocket through a gear box wherein energy is generated from all vertical movements of the large particles of mass;
   one or more cotter pins;
   a lower free floating guide sprocket;
   said gear box comprising a reversible gear box helical gearing unit;
   one or more deep set, reinforced pylons; and
   a circumference sprocket coupled to said reversible gear box.

9. The system of claim 8, wherein the one or more electrical turbines move at a minimum rate of 240 RPM.

10. The system of claim 8, further comprising:
   a plurality of sprockets mechanically coupled to a plurality of industrial bearing houses and one or more chains;
   one or more counterweight large particles of mass mechanically coupled to a series of chains;
   one or more mechanically coupled chains mechanically coupled to one or more drive arms;
   one or more drive arm assemblies comprising a set of one or more first drive arms pivotally coupled to a second set of one or more drive arms and coupled to said one or more counterweight large particles of mass;
   said drive arm assemblies fluidly coupled to one or more cylinders coupled to one or more signals to transmit kinetic energy from said one or more tidal movement waves from one or more mass-actuated pistons.

11. The system of claim 10, wherein the one or more electrical turbines move at a minimum rate of 240 rpm to generate at least two megawatts of electrical power and are mechanically coupled to an at least 40,000 ton large particle of mass.

12. A nautical torque tidal movement power generation apparatus comprising the apparatus of claim 4, wherein the one or more electrical turbines move at a minimum rate of 240 rpm to generate at least two megawatts of electrical power and are mechanically coupled to one or more large particles of mass and further comprising:
   a first water source;
   a second water source;
   a water return line wherein water in a lower water holding tank is pumped back to a second water source holding reservoir;
   one or more power device generators;
   one or more industrial gear housing assemblies coupled to a plurality of 1800 RPM accelerator assemblies to create an accelerator gear housing system wherein said accelerator gear housing system is mechanically coupled to one or more large particles of mass;
   at least one tidal movement wave wherein said tidal movement wave travels at a rate of substantially 1 foot per hour in a substantially vertical translation such that said large particles of mass floating on a surface of said tidal movement wave would travel a total of one foot per hour and wherein said large particles of mass are configured to produce electrical power in one or more power generating devices, coupled to a fixed anchor structure; and
   a torque conversion unit coupled to said one or more large particles of mass coupled to said tidal movement wave.

13. A method for providing nautical torque tidal movement power generation comprising the following steps:
   arranging one or more power generating devices;
   electrically interconnecting said one or more devices to operate independently of each other;
   positioning said devices to receive kinetic energy from the movement of water, and wherein said devices convert said energy by the movement within each of said device;
   moving said devices by coupling at least one tidal movement wave wherein said tidal movement wave travels at a rate of substantially 1 foot per hour in a substantially vertical direction such that a large particle amass floating on a surface of said tidal movement wave would travel a total of one foot per hour;
   mechanically coupling a plurality of 1800 RPM accelerator gear boxes wherein said accelerator gear boxes are mechanically coupled to said large particle of mass;
   coupling said tidal movement wave to a torque conversion unit comprising an upper drive arm coupled to a first counterbalance large particle of mass weighing at least 150 tons, a lower drive arm coupled to a floating second large particle of mass which floats on a tide and travels in a substantially vertical translation with said tide at a rate of substantially one foot per hour, said drive arms coupled to a circular sprocket, wherein the continuous upward and downward movement of the large particle of mass produces a continuous rotational movement of the circular sprocket through the accelerator gear box, causing up to 1800 revolutions per minute energy is generated from all vertical movements of the large particles of mass, one or more cotter pins, a lower free floating guide sprocket, a reversible gear box helical gearing unit, and a circumference sprocket coupled to said reversible gear box;

coupling said large particles of mass to said tidal movement wave wherein said second large particles of mass is 40,000 tons; and coupling said large particles of mass to one or more deep set, reinforced pylons.

14. The method of claim 13 wherein said second large particle of mass is a bulk cargo vessel coupled to said tidal movement wave wherein said second large particle of mass is configured to transfer the vessel's energy through a drive chain and a turn sprocket at a rate of one inch per five minutes, which will in turn rotate a second sprocket at a rate of 30 inches per five minutes which will transfer said energy to one or more power generating devices further comprising:

coupling one or more large particles of mass to said tidal movement wave and configuring said power generation devices to transfer the vessel's energy through a drive chain and a turn sprocket at a rate of one inch per five minutes, which will in turn rotate a second sprocket at a rate of 30 inches per five minutes which will transfer said energy to one or more power generating devices that are configured in a land lock design;

providing a first water source, a second water source, and water return line; pumping water in the lower water holding tank to a second water source upper holding reservoir;

arranging one or more power device generators further comprising an electrical turbine, a plurality of industrial gear housings including at least a first industrial gear housing and second industrial gear housing that comprises one or more sprockets coupled to one or more linked chains;

rotating about a pivot point wherein said speed of said first industrial gear housing is at a rate of substantially 900 inches per five minutes and a second industrial gear housing is at a rate of substantially 27,000 inches per five minutes;

coupling said plurality of industrial gear housings to a plurality of 1800 RPM accelerator gear boxes wherein said accelerator gear boxes are mechanically coupled to one or more large particles of mass;

transmitting at least one tidal movement wave from said upper holding reservoir wherein said at least one tidal movement wave travels at a rate of substantially one foot per hour in a substantially vertical translation such that said large particles of mass floating on a surface of said tidal movement wave would travel a total of one foot per hour;

configuring said large particles of mass to produce one foot per hour travel in one or more mass actuated pistons; and coupling to one or more power generating devices.

15. The method of claim 14 further comprising:

coupling said one or more power generating devices and said one or more large particles of mass to a fixed anchor structure.

16. The method of claim 13 wherein a reversible gear box is bolted to a pylon at the midway point between high and low tides to make a corresponding mark on the side of the hull of said bulk cargo vessel such that said mark corresponds with the gear box halfway between a first drive arm and a second drive arm, wherein said first and second drive arms are flush with said first and second sprockets such that said drive chain will fall plumb around said second sprocket and fall plumb to said lower drive arm and attached to lower drive arm with a first cotter pin.

17. The method of claim 16 further comprising:

producing nautical torque tidal movement electrical power generation from tidal movement;

adapting one or more electrical turbines to receive a first signal from said one or more tidal movement waves to generate one or more first electrical transmission signals;

configuring at least one drive apparatus located remotely from said one or more turbines for receiving at least one said first electrical transmission signal;

controlling the speed of rotation of the one or more electrical turbines to adjust the efficiency thereof;

outputting at least one second electrical signal to supply electrical power generated by said turbine;

configuring at least one feedback apparatus for providing at least one first control signal for use in controlling the speed of rotation of said turbine by at least one said drive apparatus to adjust the efficiency thereof;

configuring at least one control apparatus for receiving at least one said second electrical transmission signal; and outputting at least one third electrical transmission signal to supply electrical power generated by said turbine, wherein at least one said control apparatus is adapted to control the frequency of at least one said third electrical transmission signal, and wherein at least one said feedback apparatus is adapted to apply at least one said first control signal that is responsive to the frequency of at least one said third electrical signal.

18. The method of claim 17, further comprising:

generating at least two (2) megawatts electrical power renewable energy; and transmitting said at least two (2) megawatts of electrical power renewable energy.

* * * * *